United States Patent [19]
Kulkarni et al.

[11] Patent Number: 5,848,243
[45] Date of Patent: *Dec. 8, 1998

[54] NETWORK TOPOLOGY MANAGEMENT SYSTEM THROUGH A DATABASE OF MANAGED NETWORK RESOURCES INCLUDING LOGICAL TOPOLGIES

[75] Inventors: Abhay S. Kulkarni, Sunnyvale; Willie Hsu, Fremont, both of Calif.

[73] Assignee: Sun Microsystems, Inc., Mt. View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 558,274

[22] Filed: Nov. 13, 1995

[51] Int. Cl.⁶ ...................................... G06F 15/16
[52] U.S. Cl. ................... 395/200.54; 395/184.01
[58] Field of Search ..................... 395/617, 619, 395/200.01, 200.02, 200.09, 200.15, 200.53, 200.54, 184.01, 185.1, 200.51, 200.56; 707/103; 370/241; 340/825.06

[56] References Cited

U.S. PATENT DOCUMENTS

| | | | |
|---|---|---|---|
| 5,049,873 | 9/1991 | Robins et al. | 340/825.06 |
| 5,185,860 | 2/1993 | Wu | 395/200.02 |
| 5,202,985 | 4/1993 | Goyal | 395/200.09 |
| 5,261,044 | 11/1993 | Dev et al. | 395/200.53 |
| 5,276,789 | 1/1994 | Besaw et al. | 395/140 |
| 5,295,244 | 3/1994 | Dev et al. | 395/200.53 |
| 5,394,522 | 2/1995 | Sanchez-Frank et al. | 395/200.01 |
| 5,471,399 | 11/1995 | Tanaka et al. | 395/184.01 |
| 5,475,838 | 12/1995 | Fehskens et al. | 395/200.53 |
| 5,504,921 | 4/1996 | Dev et al. | 395/200.54 |
| 5,568,605 | 10/1996 | Clouston et al. | 395/200.02 |
| 5,572,640 | 11/1996 | Schettler | 395/140 |
| 5,590,120 | 12/1996 | Vaishnavi et al. | 395/200.54 |
| 5,606,664 | 2/1997 | Brown et al. | 395/200.54 |
| 5,689,645 | 11/1997 | Schettler et al. | 395/200.51 |
| 5,758,083 | 5/1998 | Singh et al. | 395/200.54 |

OTHER PUBLICATIONS

Sun Microsystems, Inc. webpage, "Product Spec: Solstice Enterprise Management," Nov. 1, 1995.
Sun Microsystems, Inc. webpage, "Solstice Enterprise Manager," Nov. 1, 1995.
Sun Microsystems, Inc. webpage, "Enterprise Management Solution," Nov. 1, 1995.
Sun Microsystems, Inc. webpage, *Solstice Enterprise Manager Screen shot, Overall view*, Nov. 1, 1995.
SunSoft, *Solstice Enterprise Manager Overview, Release 1.1*, Revision A, Jul. 1995.
Sun Microsystems, Inc., *Solstice Enterprise Manager User's Guide, Release 1.1*, Revision A, Jul. 1995.
Sun Microsystems, Inc., *Solstice Enterprise Manager Reference Manual, Release 1.1*, Revision A, Jul. 1995.

*Primary Examiner*—Richard L. Ellis
*Assistant Examiner*—Patrice L. Winder

[57] ABSTRACT

A system and method for maintaining complex relationships between computer network elements. The system provides a common database for storing node, type, and view data. The views are created and maintained by the network management system. When a new node is added or parentage of a node is changed, the views of a node are modified in a network database.

19 Claims, 13 Drawing Sheets

Parent FDN [ topoTypeDBId=Null

Object Class [ "Em Topology":topoType

| topoTypeAllBaseOf | [ { "Network", "Universe", "Subnetwork"} |
| ---: | --- |
| topoTypeAllDerivedFrom | [ { } |
| topoTypeAllLegalArcs | [ { "Link" } |
| topoTypeAllLegalChildren | [ { "Network", "Universe", "Router", "Hub", "Link", " |
| topoTypeBaseOf | [ { "Subnetwork", "Network", "Universe" } |
| topoTypeDefaultLayer | [ Default |
| topoTypeDerivedFrom | [ { } |
| topoTypeDrawMethod | [ circle |
| topoTypeId | [ Container |
| topoTypeLegalArcs | [ { "Link" } |
| topoTypeLegalChildren | [ { "Device", "Link", "Container" } |

Attribute Format:

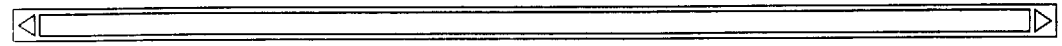

Update

*FIG. 5A*

| | |
|---|---|
| Parent FDN | I topoNodeDBId=Null |
| Object Class | I "Em Topology":topoNode |

| | |
|---|---|
| topoNodeChildren | I { } |
| topoNodeCmipAgentMO | I null : NULL |
| topoNodeDefaultMO | I object : distinguishedName : { { { attributeId "Re |
| topoNodeDisplayStatus | I { } |
| topoNodeGeoLocation | I null : NULL |
| topoNodeId | I 13 |
| topoNodeIsManaged | I TRUE |
| topoNodeLayer | I |
| topoNodeMOSet | I { } |
| topoNodeManaged | I TRUE |
| topoNodename | I febmpk16eg-075 |

Attribute Format:

[Update]

*FIG. 5B*

| Parent FDN | topoViewDBId=Null |
| --- | --- |
| Object Class | "Em Topology":topoView |

| | |
| --- | --- |
| topoNodeId | 0 |
| topoViewBackgroundImage | |
| topoViewMapConfigFile | |
| topoViewMapInitialGeoArea | null : NULL |
| nameBinding | "EM Topology":topoView-topoViewDB |
| objectClass | globalForm : "EM Topology":topoView |

Attribute Format:

Update

*FIG. 5C*

| Parent FDN | topoTypeDBId=NULL/topoNodeId=3 |
| Object Class | "Em Topology":topoViewNode |

| topoNodeId | 13 |
| topoViewNodePosition | { x 380, y 125 } |
| nameBinding | "EM Topology":topoViewNode-topoView |
| objectClass | globalForm : "EM Topology":topoViewNode |

Attribute Format:

Update

*FIG. 5D*

NETWORK TOPOLOGY MANAGEMENT SYSTEM THROUGH A DATABASE OF MANAGED NETWORK RESOURCES INCLUDING LOGICAL TOPOLGIES

COPYRIGHT NOTICE

A portion of the disclosure of this patent document contains material which is subject to copyright protection. The copyright owner has no objection to the xeroxographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of computer systems and their management and control. More specifically, in one particular embodiment the invention provides a method and device for managing and visualizing the topology of a computer network.

As computer networks have developed and achieved wide acceptance, it has become necessary for managers of such networks to have access to software and hardware tools necessary to manage, monitor, and control networks. As networks have increased in complexity, so have the tools needed for their management. Existing management packages for managing a network provide a wide range of functionality including network management application launchers, event request and filtering mechanisms, logging systems for storing network event and performance statistics, alarm correlation mechanisms, load balancing mechanisms, and other tools. Among the most advanced of such packages is SunSoft's Solstice Enterprise Manager 1.1. Other systems include Hewlett Packard's OpenView platform Network Node Manager, Operations Center and AdminCenter; IBM's NetView, and others.

The most advanced of such packages allow multiple operators to access management information simultaneously, and support multiple computing environments. To facilitate this complex functionality advanced network management systems have used an object oriented network model. Network resources represented as objects are stored and manipulated by management applications and agents. The use of such object oriented approaches enables, inter alia, much easier scalability and other advantages. In addition, the support of multiple network management protocols is facilitated. In SunSoft's Solstice products for example, the management tools may be distributed over multiple workstations. The same information is made available to all applications and tools via MISs ("Management Information Servers").

Such systems have met with substantial success and are, in fact, considered to be pioneering in the industry. However, certain challenges remain. For example, while the object oriented approach to network database management has proven successful certain limitations remain. Such systems have, previously, maintained separate databases representing the logical and physical layouts of a network, respectively. Separate applications in the network management system then access and may modify the logical and physical topology databases. In some instances it has been found that two views of the same network can be found to be inconsistent as a result of this architecture.

From the above it is seen that an improved set of tools for maintaining data relating to the physical and logical topology of a network is needed.

SUMMARY OF THE INVENTION

Improved tools for maintaining, viewing, and managing the physical and logical topology of a network are provided by virtue of the present invention. The system maintains databases for both logical and physical topology using an improved data model. Consistency is maintained by placing a consistency application in a logical/physical database. Users are able to access the data only through the physical topology database. Both physical and logical topology resides in MIS database.

Accordingly, in one embodiment the invention provides a computer network comprising a plurality of network nodes and interconnections; a network management system comprising a database of managed network resources, the database of managed network resources defining network nodes, associated node types, and associated views of the nodes; and a plurality of network management users, the network management users displaying views of the network using said network management database. Through user modification of node attributes, the views of the network are updated by the system through use of an object oriented database. In a preferred embodiment the views of the network are modified based on input or change of the attributes of the nodes. For example, parent relationships may be used to define a new view node when a new parent is added to an attribute of a node.

A further understanding of the nature and advantages of the inventions herein may be realized by reference to the remaining portions of the specification and the attached drawings.

BRIEF DESCRIPTION OF THE DRAWINGS

FIGS. 5A, 5B, 5C, and 5D illustrate specific data structures used herein; and

DESCRIPTION OF THE PREFERRED EMBODIMENTS

Figure 1:
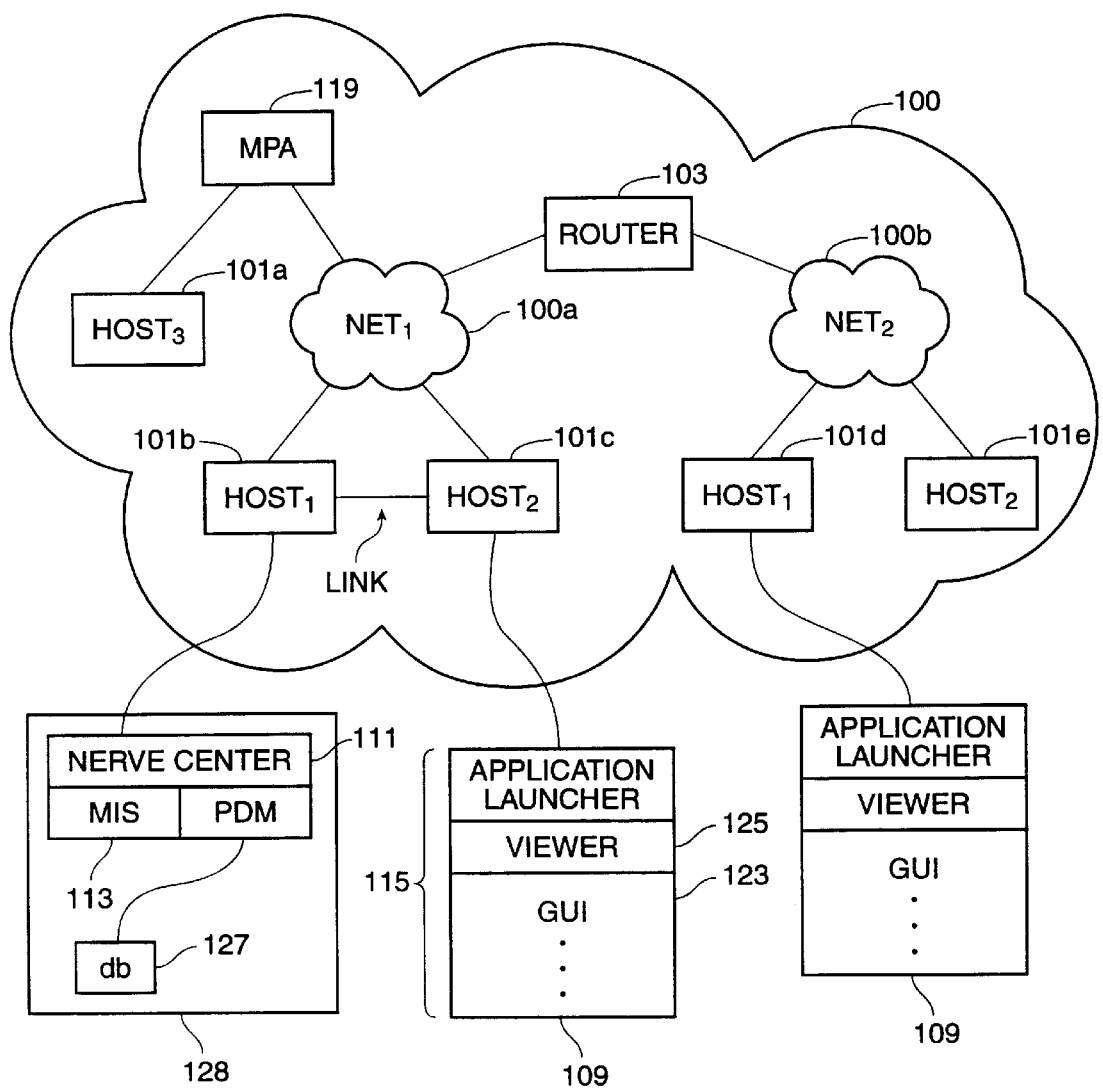
FIG. 1 is an overall view of a hypothetical network, showing the relationship to the network management tools described herein.

FIG. 1 illustrates a computer network along with its associated network management system. As shown, the computer network 100 will include hardware such as hosts 101*a*, 101*b*, 101*c*, 101*d*, and 101*e*, router 103, and subnetworks 100*a* and 100*b*. Hosts 101 may be, for example, users, servers, and other network elements. Attached to one or more of the hosts are network management elements 109. Management elements 109 will be connected to one or more of the network hosts for network managers to monitor and control the network.

The layout of the network is illustrated with regard to physical connectivity, but another set of relationships will also exist. That is, the various elements of the network will also be related by logical relationships. For example, a portion of the users connected to servers 101*a* and 101*b* may be in one logical group, while other portions of the network will be in other logical groups. Often it is desirable for network managers to be able to view the network in logical views rather than the physical layout of the network. The present invention provides an improved viewer for looking at and analyzing various portions of the network.

A management system or "nerve center" 111 is provided in the network to manage and control the network. While the management system 111 is illustrated as a single entity on the network, it may in many embodiments be distributed over multiple workstations and servers.

The management system includes an MIS or Management Information Server 113. The MIS is an object oriented network model that enables object definitions to be stored and manipulated by management applications 115, using object oriented tools such as classing, inheritance and scoping to represent complex resources and simplify complex operations. Management applications 115 interact through the network MIS rather than with each other.

System 111 will normally include a set of standard tools such as a relational database logging tool, alarm managers, and other tools. The system is able to provide access to managed objects via a common management information protocol (CMIP) with management protocol adapter (MPA) 119. Other system elements are supported directly through an interface such as a protocol driver manager (PDM) in the case of, for example, SunNet Manager Agent interactions.

As shown in FIG. 1, a particular user of the system will have applications 115 resident on his/her particular server or workstation. In addition, the user may have various tools, a particular graphical user interface 123, and viewer 125. The various applications utilize the resources of the nerve center to perform management tasks. A database 127 in the nerve center provides a single source of network objects in an object oriented relational database to service the various network applications for management of the network. The system illustrated in FIG. 1 will, in a preferred embodiment, be based on the Solstice Enterprise Manager 1.1, available from Sun Microsystems, Inc. The various software and data elements discussed herein are stored on a memory device 128 such as one or more magnetic or optical disc drives.

Figure 2:
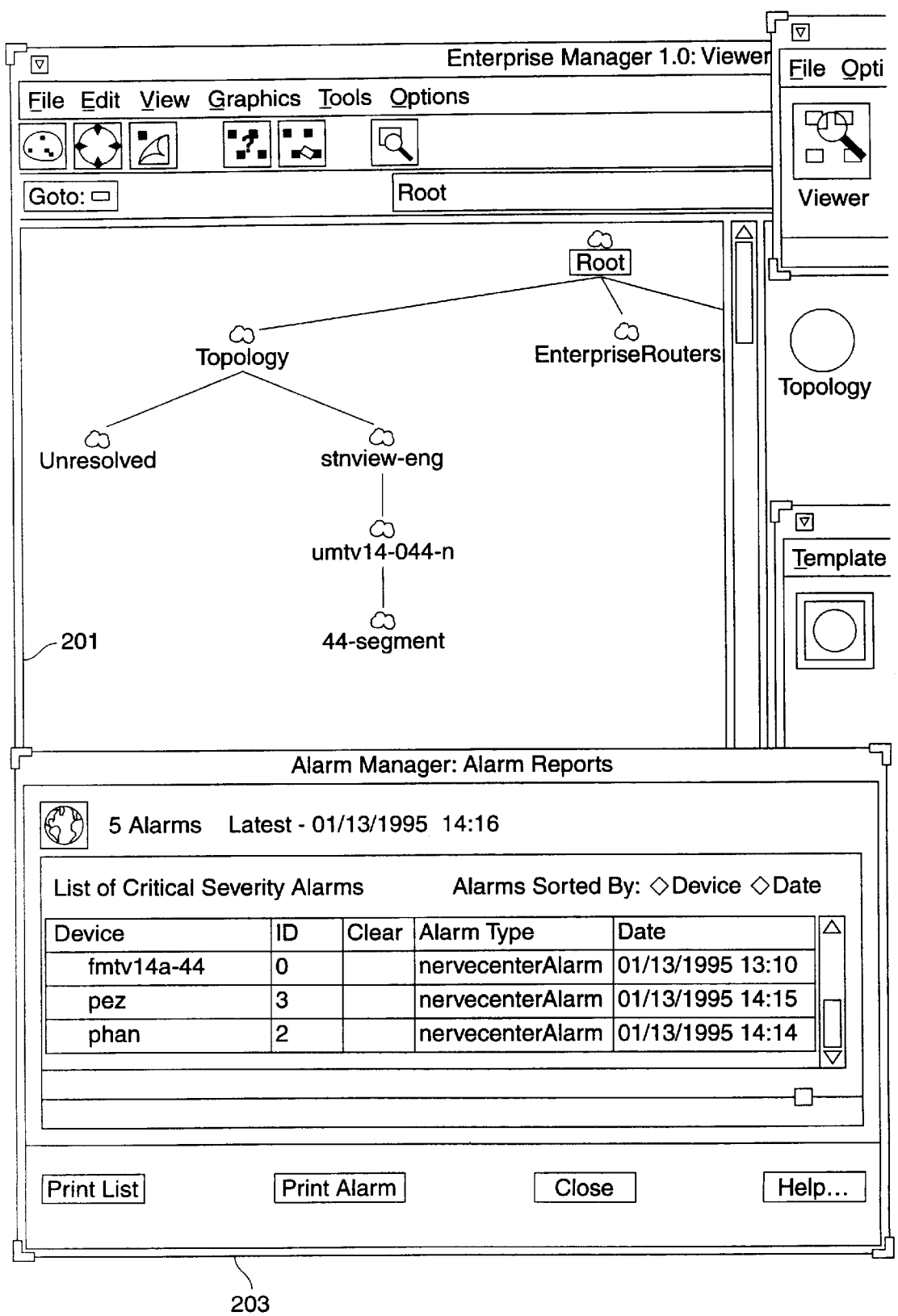
FIG. 2 is a typical screen display provided by one embodiment of the invention.

FIG. 2 illustrates a typical screen display available to a user of the network management system disclosed herein. As shown, the system will display a viewer 201 in which the topology of the system (logical or physical) may be displayed. In addition, the system may display other items of interest such as an alarm report 203.

Figure 3:
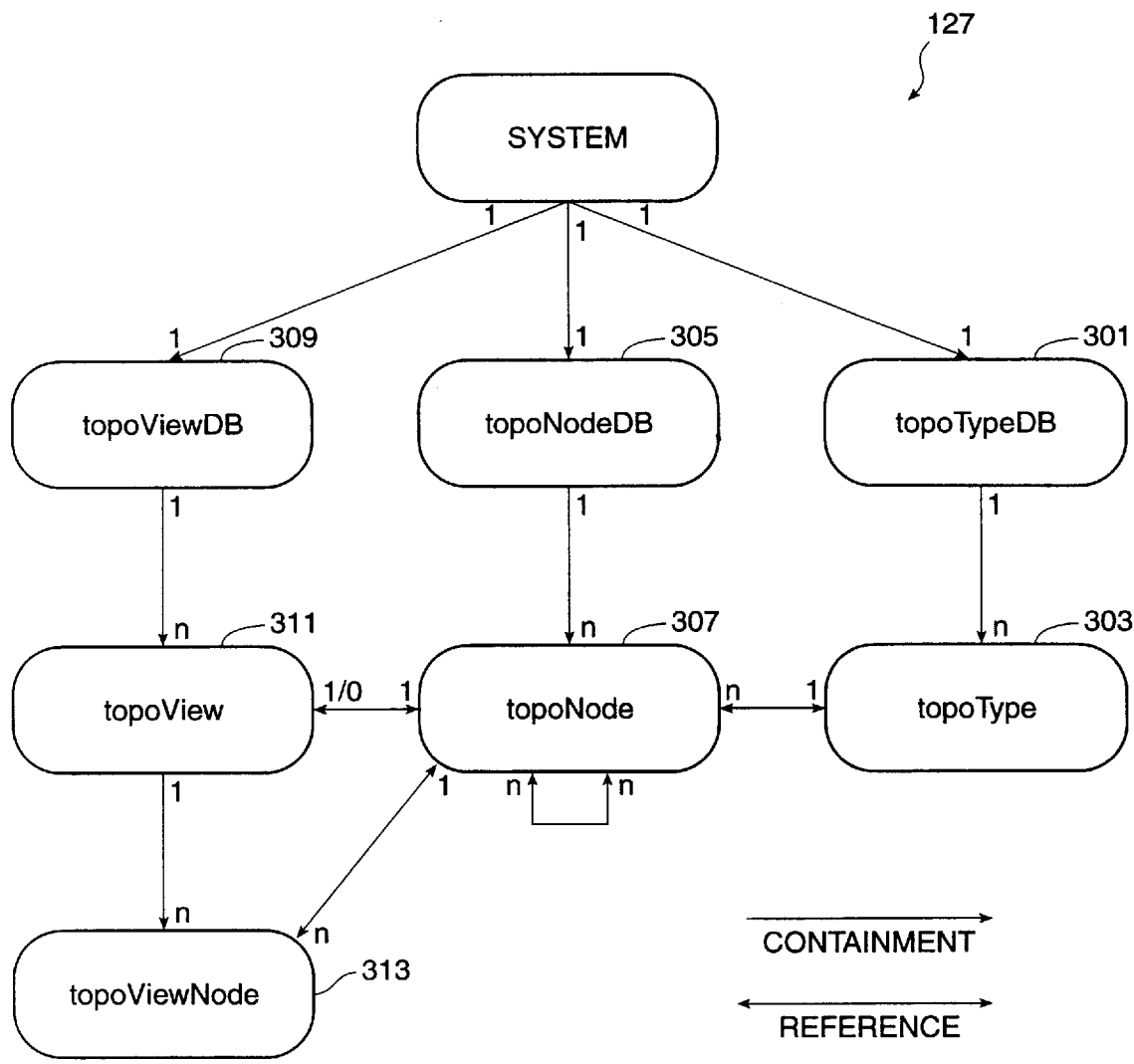
FIG. 3 is an object relationship diagram according to one specific embodiment of the invention.

Both the logical and physical elements of the network model are stored in a common database 127 according to the invention herein. FIG. 3 illustrates the architecture of the network database 127 according to a preferred embodiment of the invention. The purpose of the topology database is to store topological information about the managed networked environments. Topological information is in the form of objects which represent topological nodes, views, viewnodes, and types. The topology database includes data of the following types: a topoTypeDB, a topoNodeDB, and a topoViewDB. These data are used by the system applications to manage the user's networks.

topoTypeDB

The topoTypeDB object class 301 contains the general relationship or rules between objects (which represent a topoType 303). In other words, topoTypeDB contains a list of object types. Examples of such object types would be servers, routers, hubs, and users.

The topoTypeDB is a managed object class that acts as a "container" for all topoType objects. The topoTypeDB object class is named under the system object and only one instance of a topoTypeDB object class can be created under a system. TopoType is an object class that is named under the topoTypeDB object class.

topoNodeDB

The topoNodeDB object class 305 contains a flat layout of the objects in the particular managed networked environment, that is, lists of all nodes 307 in the network and their attributes.

The topoNodeDB is a managed object class that acts as the "container" for all topoNode objects. This object class lists all nodes and their attributes. The topoNodeDB object class is named under the system object and only one instance of the topoNodeDB object class can be created under a system.

TopoNode is an object class that is named under the topoNodeDB object class. The topoNode object class has the following features. TopoNode can be positioned in multiple views. This attribute is allowed since the behavior of "topoTypeLegalChildren" is checked for all parents specified by the attribute. The ASN1 syntax of topoNodeParents is a set of topoNodeId's. Special secondary index queries can be done with actions. TopoNode objects can be renamed. The topoNodeName attribute is unique across all topoNodes under the same topoNode DB. The reason that topoNodeName is not used as the naming attribute is to allow renaming of topoNode objects. If a topoNode object is renamed, it's new name cannot be the same as the name of an existing node.

A topoNodeChildren attribute is a reverse relationship attribute of a topoNodeParents attribute. It specifies all the topoNode children that are contained by this topoNode. Propagation severity of topoNode objects can be tracked and propagation can be controlled such that, for example, alarms are indicated in desired views.

Each node has an associated severity, derived from alarms posted for the corresponding resource. The tracking of the propagated severity is performed with a "topoNodePropagateSeverity" attribute. This attribute is the maximum value of the topoNodeSeverity of the topoNode and the topoNodePropagateSeverity of all its children.

To control propagation locally, a topoNode's "topoNodePropagateUp" attribute is used. To turn the propagation off for the entire topology database, the topoNodeDB's "topoStatePropagation" attribute is used. By default, the global propagation flag is set on. A topoNode propagates its current severity to its parents only if its topoNodePropagateUp flag is on and topoNodeDB's topoStatePropagation flag is on.

topoViewDB

The topoViewDB 309 object class contains views of the objects in the managed networked environment, that is, of all views 311. The various views contain logical groups of network resources or topology nodes that a user may wish to use for management purposes. For example, a view of various ethernet servers in a network may be desired to monitor the failure rate of such servers. Thus, a view of such servers will be formed.

TopoViewDB is a managed object class that acts as the container for all topoview objects. TopoViewDB lists all views; each of these views are called a topoview. The topoViewDB object class is named under the system object and only one instance of the topoViewDB object class can be created under a system. A view is a graphical representation of a set of related managed objects. For example, in a network that contains multiple subnetworks, the network might be one view that has subnetwork elements and each subnetwork within it might constitute or use separate views.

TopoView is an object class that lists views and is named under the topoViewDB object class. Each topoview object is called a topoViewNode. Each instance of the topoview class represents a view in an executable viewing program (em_viewer in the case of SunSoft) to display objects that are in the view and store attributes that are related to the view. TopoView objects show relationships and hierarchy between objects. Instances of the class are named under topoViewDB, but create/delete operations are not supported by the name binding.

The topoViewNode objects 313 represent topoNode objects in different views (different logical views). Each topoViewNode object is associated with a topoNode object. There is a many-to-one relationship between topoViewNode and topoNode objects. If the information is available in the topoViewNode's associated topoNode object, the information is not duplicated in the topViewNode object. The exception is that the topoNodeId attribute is used as the naming attribute to create topoViewNode objects.

Since instances of the class are named under topoview, create/delete operations are not supported by the name binding. All topoViewNode objects are created/deleted as side effects of creating/deleting topoNodes and adding/removing parents to form a "topoNodeParents" attribute of topoNode objects. The MIS is responsible for maintaining the referential integrity between topoViewNode and topoNode objects (for example, a topoNode can contain other topoNodes).

TopoViewNode objects are automatically updated. When a new parent is added to the topoNodeParents attribute, the MIS creates a topoViewNode object associating to the topoNode under a topoview object which associates to the new parent. When an old parent is removed from topoNodeParents, the MIS deletes the topviewNode object associating to the topoNode from the topoview object which associates to the old parent. If the user wants to move or place a topoNode in a different or another view, it will be necessary to change the topoNode's topoNodeParents attribute.

Data integrity between topoNode, topoview, and topoViewNode is maintained by the system. Data integrity is maintained by the behavior, in the system herein, of the class. Once a new topoNode is created, if the type of the topoNode can contain other topoNodes, the MIS will create a topoview object associated to the topoNode. If a topoNode is deleted, all topoview and topoViewNode objects associated with the topoNode are automatically removed by the MIS.

FIG. 3 includes a description of the containment of the various objects in the database. Specifically, TopoViewDB, topoNodeDB, and topoTypeDB are contained within the "system." A topoview is contained within the topoViewDB. A topoViewNode is contained within a topoview. A topoNode is contained within the topoNodeDB. A topoType is contained within the topoTypeDB.

The reference rules for the database are as follows. A topoview must reference a topoNode. Only one topoview can reference a single topoNode. A topoViewNode must reference a topoNode. One or more topdViewNodes can reference a single topoNode. A topoNode can reference other topoNodes as topoNodeParents or topoNodeChildren. A topoNode must reference one topoType. A topoType can be referenced by multiple topoNodes.

Table 1 provides general descriptions of topology types.

TABLE 1

| Topology Type | Description |
| --- | --- |
| Container | A generic view representation. |
| Universe | A generic view, generally used at the top level. |
| Internet | Any combination of IP networks. |
| Subnetwork | Containers specific to the Internet. |
| Host | An IP device on a network. |
| Device | A generic representation of a network element. |
| Link | A physical connection between two network elements. |
| Router, Bridge, Hub | Multiple interface devices capable of transferring packets between networks. |

Figure 4A:
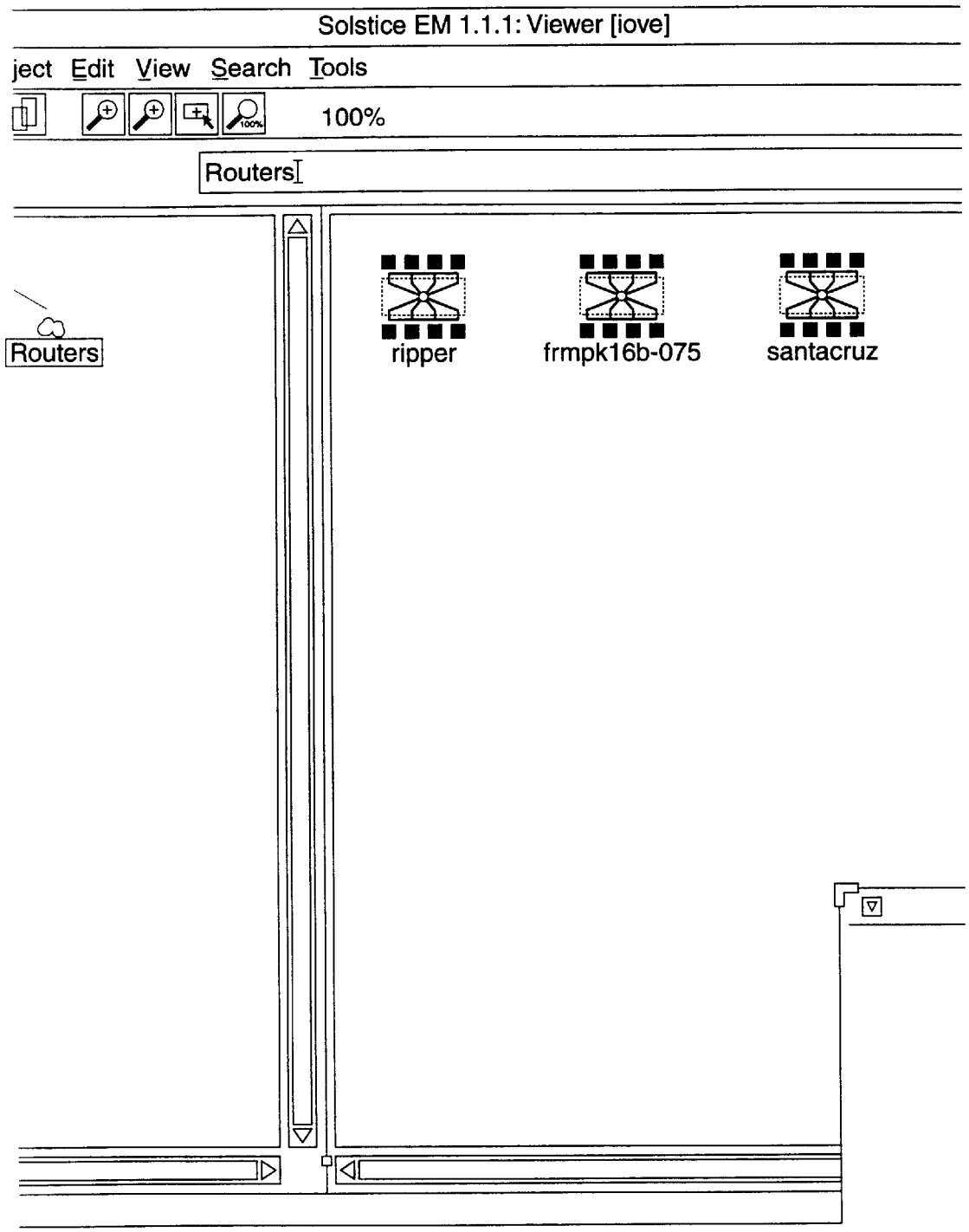
FIGS. 4A, 4B, and 4C illustrate a simple application of the invention.
Figure 4B:
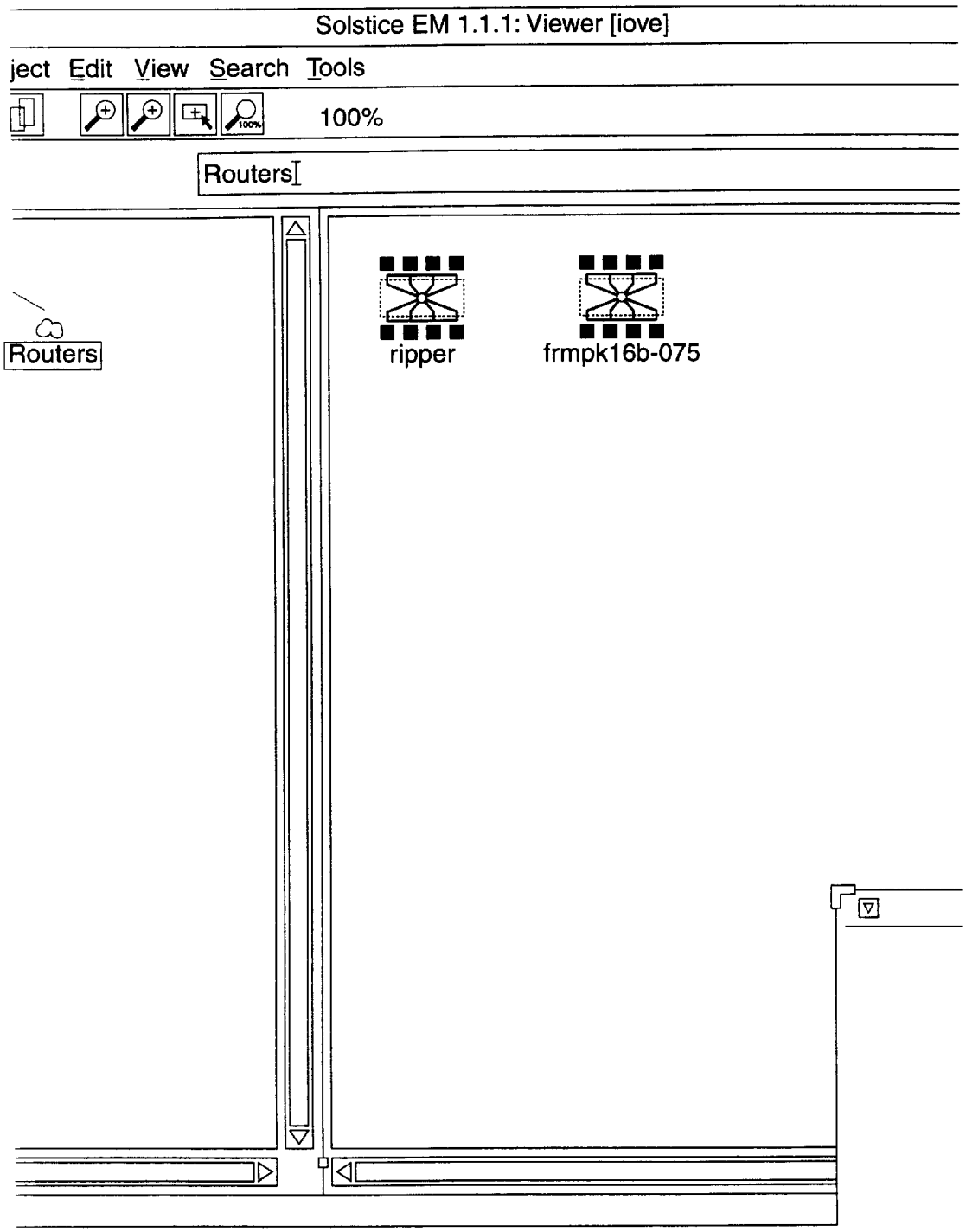
Figure 4C:
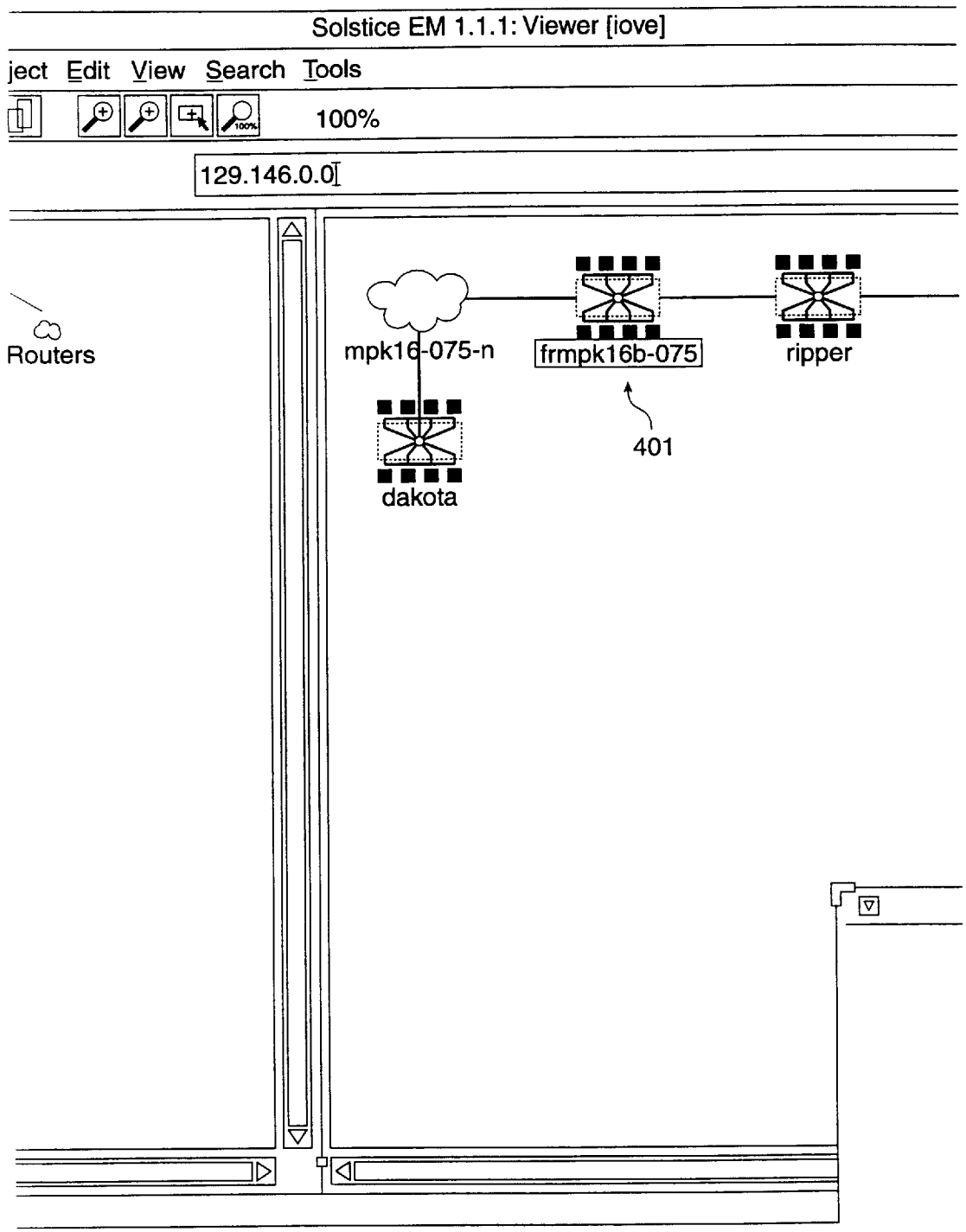

FIGS. 4A to 4C illustrate various views of a network using the system herein. FIG. 4A illustrates a view of several routers 401 in a network. FIG. 4B illustrates a new view that has been created including only two of the routers that a particular user desires to monitor. FIG. 4C illustrates the display after using the system to add another router to the view. Of course, the layout of networks is most often quite complex and FIGS. 4A–4C shows only a simple illustration.

FIGS. 5A to 5D illustrate the data formats and contents of a particular topoType (FIG. 5A), topoNode (FIG. 5B), topoview (FIG. 5C), topoViewNode (FIG. 5D). Of interest, in topoNode, the topoNodeChildren entry (and, not shown, parents) is changed upon change or deletion of, e.g., a parent or other relevant attribute.

FIG. 5A illustrates the data structure for a topoType. FIG. 5B illustrates a topoNode entry. FIG. 5C illustrates a particular topoview entry. FIG. 5D illustrates the topoViewNode entry for node 13 in FIG. 5B.

The definition of all objects is preferably in GDMO (Guidelines for Definition of Managed Objects) format. The definitions according to one embodiment are included in Appendix 1 (topo.gdmo). The syntax for GDMO objects is defined in ASN.1. Appendix 2 (topo.asn1) provides object syntax according to one specific embodiment of the invention.

EXAMPLE

Figure 6A:
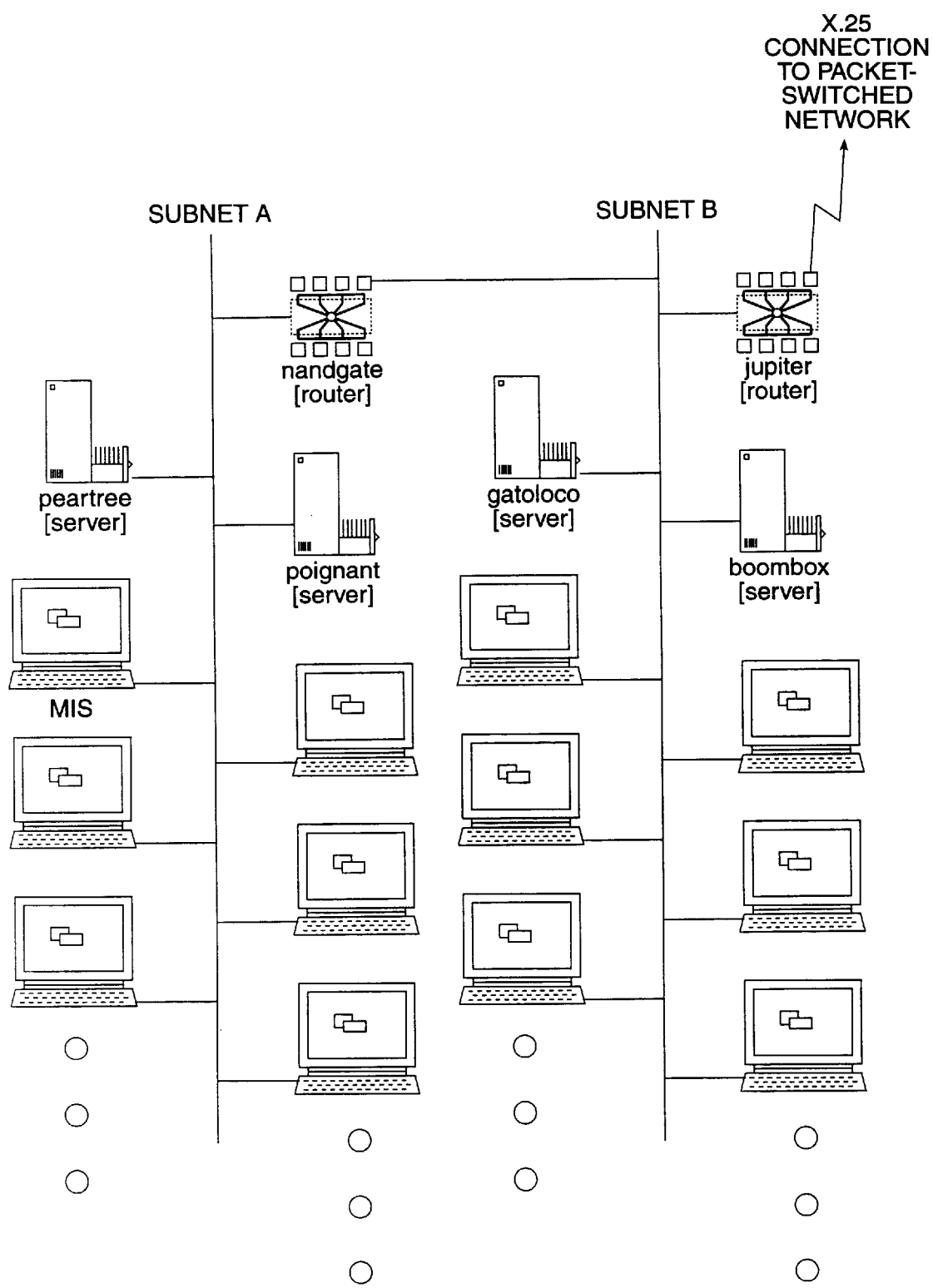
FIGS. 6A, 6B, and 6C illustrate use of the invention in specific examples.
Figure 6B:
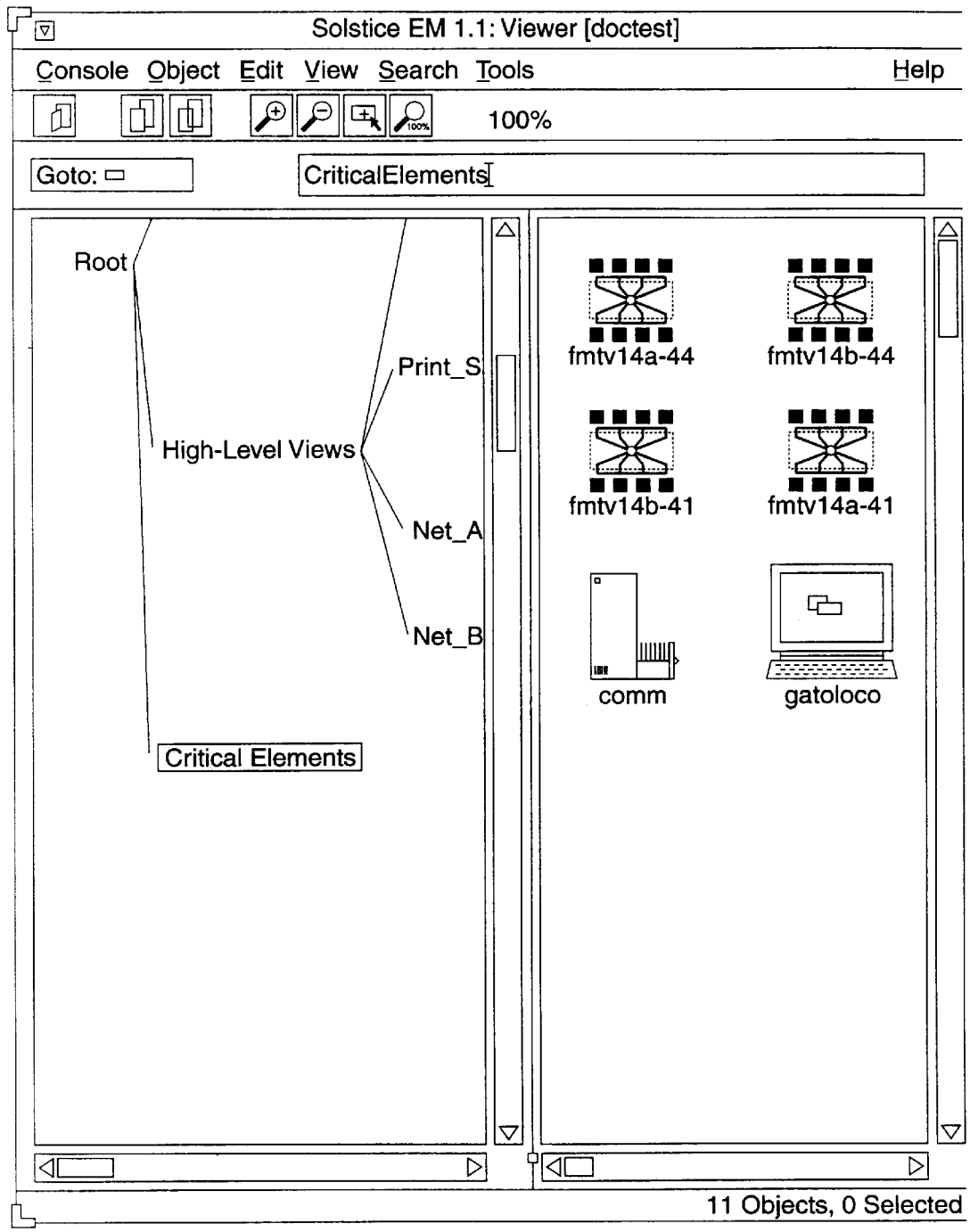
Figure 6C:
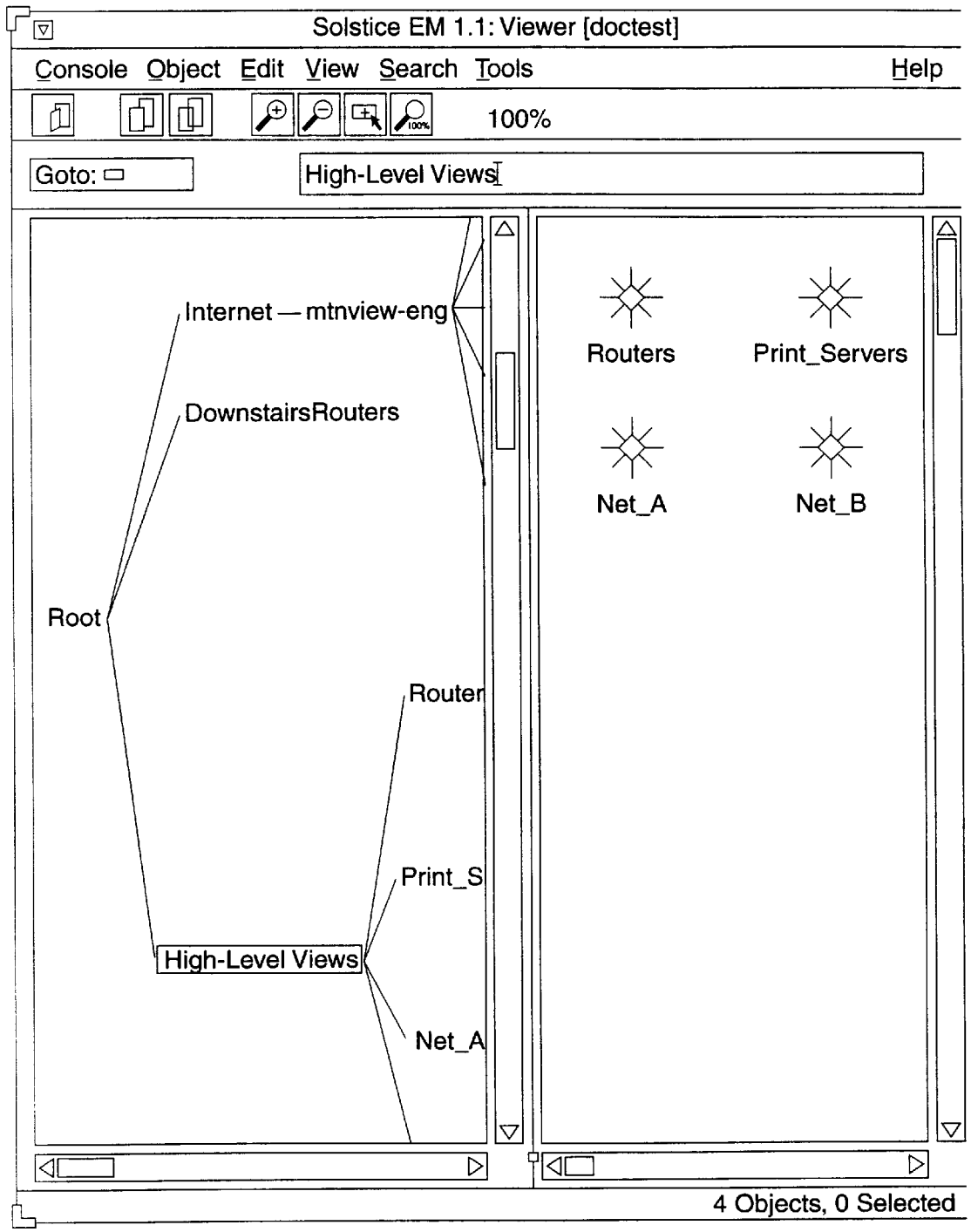

FIGS. 6A to 6C illustrate typical use of the present invention. A user typically identifies objects such as routers, hubs, bridges, print servers, NFS servers, and WAN links that have an impact on the greatest number of users on the network. The typical user will then monitor only those devices, reducing the number of managed objects to create and monitor.

In the system herein a view of the network can include part (or all) of a network topology or it can simply be an arbitrary collection of managed objects, not part of the topology. In a small scale network, one might wish to place all the critical nodes into a single view of the network, as shown in FIG. 6A. In this example, a network includes two subnets (A and B), which are connected by a router.

For most network configurations it will be useful to have multiple views of the network to represent functional groupings of network devices and to represent the network topology. Using the database model discussed above, one might want, for example, to depict devices in particular buildings, or a view that consists only of routers. Taking the example in FIG. 6A one might want to create a separate view for each subnet as well as separate views by type of device (routers, NFS servers, and print servers). A user would create these views one element at a time using a graphical user interface, which would then build the database elements discussed above. As an example, views grouping elements by function (software servers, routers, and print servers) and subnetwork (s) might be formed as shown in FIG. 6B. A high level view is shown in FIG. 6C. As shown therein, cloud icons represent the separate views that have been created. By double clicking on the clouds, one would then see the elements within these views of the network. of course, the same element may appear in multiple views. For example, a particular server could occur in both a "servers" view as well as the Net_B view, which shows all of the nodes in that subnetwork.

The above description is illustrative and not restrictive. Many variations of the invention will become apparent to those of skill in the art upon review of this disclosure. Merely by way of example specific database relationships have been used for illustration, but the invention is not so limited. The scope of the invention should, therefore, be determined not with reference to the above description, but instead should be determined with reference to the appended claims along with their full scope of equivalents.

08/558274

APPENDIX 1 topo.gdmo

© Copyright 1995
Sun Microsystems, Inc.
All Rights Reserved

```
-- @(#)topo.gdmo     2.14 95/07/12 Sun Microsystems.
-- Copyright 12 Jul 1995 Sun Microsystems, Inc.  All Rights Reserved MODULE "EM Topology"

-- OBJECT CLASS topoNode MANAGED OBJECT CLASS
        DERIVED FROM "Rec. X.721 | ISO/IEC 10165-2 : 1992" : top;
        CHARACTERIZED BY
                topoNodePackage;
        REGISTERED AS { em-topo-objectClass 1 };

topoNodePackage PACKAGE
        BEHAVIOUR topoNodePackageDefinition BEHAVIOUR DEFINED AS
                !This managed object class represents a single node
                in the topo graph.  A node is anything in the network
                which can be connected to another thing: a device,
                a part of a device, an interface, a cable, etc.

Once a new topoNode is created, if the type of the topoNode
                can contain other topoNodes, the system will create a
                topoView object associated to the topoNode.

If a topoNode is deleted, all topoView and topoViewNode objects
                associated to the topoNode are automatically removed.

The topoNodeName attribute is unique across all topoNodes under
                the same topoNodeDB. The reason that topoNodeName is not used
                for naming attribute is to allow renaming of the object.

The topoNodeParents attribute is a relationship attribute.
                It is used to specify the parent topoNodes which contain this
                topoNode. Note the containment relationship is a many-to-many
                relationships. It is different than the standard OSI MIT
                containment relationship, which is a one-to-many relationship.
                The many-to-many relationship provides the flexibility by
                which the user can position the same topoNode into different
                views.

When a new parent is added to the topoNodeParents attribute,
                the system creates a topoViewNode object associating to the
                topoNode under the topoView object which associates to the new
                parent.

When a old parent is removed from the topoNodeParents attribute,
                the system delete the topoViewNode object associating to the
                topoNode from the topoView object which associates to the old
                parent.

The topoNodeChildren attribute is a reverse relationship
                attribute of the topoNodeParents attribute. It is used to
                specify the children topoNodes contained by this topoNode.
                !;
        ;
        ATTRIBUTES
                topoNodeId GET,
                topoNodeName GET-REPLACE,
                topoNodeType GET-REPLACE,
                topoNodeMOSet
                        DEFAULT VALUE EM-TOPO-ASN1.emptyTopoNodeMOSet
                        GET-REPLACE,
                topoNodeCmipAgentMO
                        DEFAULT VALUE EM-TOPO-ASN1.nullTopoNodeMO
                        GET-REPLACE,
                topoNodeRpcAgentMO
```

```
                DEFAULT VALUE EM-TOPO-ASN1.nullTopoNodeMO
                GET-REPLACE,
        topoNodeSnmpAgentMO
                DEFAULT VALUE EM-TOPO-ASN1.nullTopoNodeMO
                GET-REPLACE,
        topoNodeDefaultMO
                DEFAULT VALUE EM-TOPO-ASN1.nullTopoNodeMO
                GET-REPLACE,
        topoNodeParents GET-REPLACE ADD-REMOVE,
        topoNodeChildren GET,
        topoNodePeers GET-REPLACE ADD-REMOVE,
        topoNodeManaged GET-REPLACE,
        topoNodeIsManaged GET,
        topoNodeState GET-REPLACE,
        topoNodeSeverity GET-REPLACE,
        topoNodePropagatedSeverity GET,
        topoNodePropagateUp
                DEFAULT VALUE EM-TOPO-ASN1.topoBooleanTrue
                GET-REPLACE,
        topoNodeDisplayStatus
                DEFAULT VALUE EM-TOPO-ASN1.emptyTopoNodeDisplayStatus
                GET-REPLACE ADD-REMOVE,
        topoNodeGeoLocation
                DEFAULT VALUE EM-TOPO-ASN1.nullGeoLocation
                GET-REPLACE,
        topoNodeLayer
                DEFAULT VALUE EM-TOPO-ASN1.emptyLayer
                GET-REPLACE,
        topoNodeUserData
                DEFAULT VALUE EM-TOPO-ASN1.emptyUserData
                GET-REPLACE
                ;
        NOTIFICATIONS
                "Rec. X.721 | ISO/IEC 10165-2 : 1992" :
                        objectCreation,
                "Rec. X.721 | ISO/IEC 10165-2 : 1992" :
                        objectDeletion,
                "Rec. X.721 | ISO/IEC 10165-2 : 1992" :
                        attributeValueChange;
                ;

topoNodeDB MANAGED OBJECT CLASS
        DERIVED FROM "Rec. X.721 | ISO/IEC 10165-2 : 1992" : top;
        CHARACTERIZED BY
                topoNodeDBPackage;
        REGISTERED AS { em-topo-objectClass 2 };

topoNodeDBPackage PACKAGE
        BEHAVIOUR topoNodeDBPackageDefinition BEHAVIOUR DEFINED AS
                !This managed object class acts as the container for
                all topoNode-related objects.!;
                ;
        ATTRIBUTES
                topoNodeDBId GET,
                topoAllStatus
                        DEFAULT VALUE EM-TOPO-ASN1.emptyTopoAllStatus
                        GET-REPLACE ADD-REMOVE,
                topoAllLayer
                        DEFAULT VALUE EM-TOPO-ASN1.emptyTopoAllLayer
                        GET-REPLACE ADD-REMOVE,
                topoStatePropagation
                        DEFAULT VALUE EM-TOPO-ASN1.topoBooleanTrue
                        GET-REPLACE
                ;
        ACTIONS
                topoNodeGetByName,
```

```
                topoNodeGetByType,
                topoNodeGetByMO,
                topoGetViewGraph;
        NOTIFICATIONS
                "Rec. X.721 | ISO/IEC 10165-2 : 1992" :
                        objectCreation,
                "Rec. X.721 | ISO/IEC 10165-2 : 1992" :
                        objectDeletion;
        ;

topoType MANAGED OBJECT CLASS
        DERIVED FROM "Rec. X.721 | ISO/IEC 10165-2 : 1992" : top;
        CHARACTERIZED BY
                topoTypePackage;
        REGISTERED AS { em-topo-objectClass 3 };

topoTypePackage PACKAGE
        BEHAVIOUR topoTypePackageDefinition BEHAVIOUR DEFINED AS
                !This managed object class specifies schema information
                that defines how the Topology database can be constructed.!;
        ;
        ATTRIBUTES
                topoTypeId GET,
                topoTypeDerivedFrom GET,
                topoTypeAllDerivedFrom GET,
                topoTypeBaseOf GET,
                topoTypeAllBaseOf GET,
                topoTypeMaxVisibleLevel
                        DEFAULT VALUE EM-TOPO-ASN1.defaultMaxVisibleLevel
                        GET,
                topoTypeMaxTopoLevel
                        DEFAULT VALUE EM-TOPO-ASN1.defaultMaxTopoLevel
                        GET,
                topoTypeLegalArcs
                        DEFAULT VALUE EM-TOPO-ASN1.defaultTopoTypes
                        GET ADD,
                topoTypeAllLegalArcs GET,
                topoTypeLegalChildren
                        DEFAULT VALUE EM-TOPO-ASN1.defaultTopoTypes
                        GET ADD,
                topoTypeAllLegalChildren GET,
                topoTypeDrawMethod
                        DEFAULT VALUE EM-TOPO-ASN1.defaultDrawMethod
                        GET-REPLACE
                ,
                topoTypeDefaultLayer GET-REPLACE
                ;
        NOTIFICATIONS
                "Rec. X.721 | ISO/IEC 10165-2 : 1992" :
                        objectCreation,
                "Rec. X.721 | ISO/IEC 10165-2 : 1992" :
                        objectDeletion,
                "Rec. X.721 | ISO/IEC 10165-2 : 1992" :
                        attributeValueChange;
        ;

topoTypeDB MANAGED OBJECT CLASS
        DERIVED FROM "Rec. X.721 | ISO/IEC 10165-2 : 1992" : top;
        CHARACTERIZED BY
                topoTypeDBPackage;
        REGISTERED AS { em-topo-objectClass 4 };

topoTypeDBPackage PACKAGE
        BEHAVIOUR topoTypeDBPackageDefinition BEHAVIOUR DEFINED AS
                !This managed object class acts as the container for
                all topoType-related objects.!;
```

```
        ;
        ATTRIBUTES
                topoTypeDBId GET;
        NOTIFICATIONS
                "Rec. X.721 | ISO/IEC 10165-2 : 1992" :
                        objectCreation,
                "Rec. X.721 | ISO/IEC 10165-2 : 1992" :
                        objectDeletion;
        ;

topoView MANAGED OBJECT CLASS
        DERIVED FROM "Rec. X.721 | ISO/IEC 10165-2 : 1992" : top;
        CHARACTERIZED BY
                topoViewPackage;
        REGISTERED AS { em-topo-objectClass 5 };

topoViewPackage PACKAGE
        BEHAVIOUR topoViewPackageDefinition  BEHAVIOUR DEFINED AS
                !This managed object class is used to
                store information for the topological view application.!;
        ;
        ATTRIBUTES
                topoNodeId GET,
                topoViewBackgroundImage
                        DEFAULT VALUE EM-TOPO-ASN1.defaultBackgroundImage
                        GET-REPLACE,
                topoViewMapConfigFile
                        DEFAULT VALUE EM-TOPO-ASN1.defaultMapConfigFile
                        GET-REPLACE,
                topoViewMapInitialGeoArea
                        DEFAULT VALUE EM-TOPO-ASN1.defaultMapInitialGeoArea
                        GET-REPLACE;
        NOTIFICATIONS
                "Rec. X.721 | ISO/IEC 10165-2 : 1992" :
                        objectCreation,
                "Rec. X.721 | ISO/IEC 10165-2 : 1992" :
                        objectDeletion,
                "Rec. X.721 | ISO/IEC 10165-2 : 1992" :
                        attributeValueChange;
        ;

topoViewDB MANAGED OBJECT CLASS
        DERIVED FROM "Rec. X.721 | ISO/IEC 10165-2 : 1992" : top;
        CHARACTERIZED BY
                topoViewDBPackage;
        REGISTERED AS { em-topo-objectClass 6 };

topoViewDBPackage PACKAGE
        BEHAVIOUR topoViewDBPackageDefinition BEHAVIOUR DEFINED AS
                !This managed object class acts as the container for
                all topoView-related objects.!;
        ;
        ATTRIBUTES
                topoViewDBId GET,
                topoViewNodeAutoPosition
                DEFAULT VALUE EM-TOPO-ASN1.topoBooleanTrue
                GET-REPLACE
        ;
        NOTIFICATIONS
                "Rec. X.721 | ISO/IEC 10165-2 : 1992" :
                        objectCreation,
                "Rec. X.721 | ISO/IEC 10165-2 : 1992" :
                        objectDeletion;
        ;

topoViewNode MANAGED OBJECT CLASS
```

```
        DERIVED FROM "Rec. X.721 | ISO/IEC 10165-2 : 1992" : top;
        CHARACTERIZED BY
                topoViewNodePackage;
        REGISTERED AS { em-topo-objectClass 7 };

topoViewNodePackage PACKAGE
        BEHAVIOUR topoViewNodePackageDefinition BEHAVIOUR DEFINED AS
                !This managed object class is used to
                store information for the topological view node.!;
        ;
        ATTRIBUTES
                topoNodeId GET,
                topoViewNodePosition GET-REPLACE;
        NOTIFICATIONS
                "Rec. X.721 | ISO/IEC 10165-2 : 1992" :
                        objectCreation,
                "Rec. X.721 | ISO/IEC 10165-2 : 1992" :
                        objectDeletion,
                "Rec. X.721 | ISO/IEC 10165-2 : 1992" :
                        attributeValueChange;
        ;

-- Name Bindings topoNodeDB-system NAME BINDING
        SUBORDINATE OBJECT CLASS topoNodeDB;
        NAMED BY
        SUPERIOR OBJECT CLASS
                "Rec. X.721 | ISO/IEC 10165-2 : 1992" : system AND SUBCLASSES;
        WITH ATTRIBUTE topoNodeDBId;
        BEHAVIOUR topoNodeDB-systemBehavior
                BEHAVIOUR DEFINED AS
                !This name binding defines the location of the
                topoNodeDB object.!;
        ;
        CREATE;
        DELETE ONLY-IF-NO-CONTAINED-OBJECTS;
        REGISTERED AS { em-topo-binding 1 };

topoTypeDB-system NAME BINDING
        SUBORDINATE OBJECT CLASS topoTypeDB;
        NAMED BY
        SUPERIOR OBJECT CLASS
                "Rec. X.721 | ISO/IEC 10165-2 : 1992" : system AND SUBCLASSES;
        WITH ATTRIBUTE topoTypeDBId;
        BEHAVIOUR topoTypeDB-systemBehavior
                BEHAVIOUR DEFINED AS
                !This name binding defines the location of the
                topoTypeDB object.!;
        ;
        CREATE;
        DELETE ONLY-IF-NO-CONTAINED-OBJECTS;
        REGISTERED AS { em-topo-binding 2 };

topoViewDB-system NAME BINDING
        SUBORDINATE OBJECT CLASS topoViewDB;
        NAMED BY
        SUPERIOR OBJECT CLASS
                "Rec. X.721 | ISO/IEC 10165-2 : 1992" : system AND SUBCLASSES;
        WITH ATTRIBUTE topoViewDBId;
        BEHAVIOUR topoViewDB-systemBehavior
                BEHAVIOUR DEFINED AS
                !This name binding defines the location of the
                topoViewDB object.!;
        ;
        CREATE;
```

```
        DELETE ONLY-IF-NO-CONTAINED-OBJECTS;
        REGISTERED AS { em-topo-binding 3 };

topoNode-topoNodeDB NAME BINDING
        SUBORDINATE OBJECT CLASS topoNode;
        NAMED BY
        SUPERIOR OBJECT CLASS topoNodeDB;
        WITH ATTRIBUTE topoNodeId;
        BEHAVIOUR topoNode-topoNodeDBBehaviour
                BEHAVIOUR DEFINED AS
                !This name binding defines the location of topoNode objects.!;
        ;
        CREATE WITH-AUTOMATIC-INSTANCE-NAMING;
        DELETE ONLY-IF-NO-CONTAINED-OBJECTS;
        REGISTERED AS { em-topo-binding 4 };

topoType-topoTypeDB NAME BINDING
        SUBORDINATE OBJECT CLASS topoType;
        NAMED BY
        SUPERIOR OBJECT CLASS topoTypeDB;
        WITH ATTRIBUTE topoTypeId;
        BEHAVIOUR topoType-topoTypeDBBehaviour
                BEHAVIOUR DEFINED AS
                !This name binding defines the location of topoType objects.!;
        ;
        CREATE;
        DELETE ONLY-IF-NO-CONTAINED-OBJECTS;
        REGISTERED AS { em-topo-binding 5 };

topoView-topoViewDB NAME BINDING
        SUBORDINATE OBJECT CLASS topoView;
        NAMED BY
        SUPERIOR OBJECT CLASS topoViewDB;
        WITH ATTRIBUTE topoNodeId;
        BEHAVIOUR topoView-topoViewDBBehaviour
                BEHAVIOUR DEFINED AS
                !This name binding defines the location of topoView objects.'
                This name binding doesn't support create and delete management
                operations.!;
        ;
        REGISTERED AS { em-topo-binding 6 };

topoViewNode-topoView NAME BINDING
        SUBORDINATE OBJECT CLASS topoViewNode;
        NAMED BY
        SUPERIOR OBJECT CLASS topoView;
        WITH ATTRIBUTE topoNodeId;
        BEHAVIOUR topoViewNode-topoViewBehaviour
                BEHAVIOUR DEFINED AS
                !This name binding defines the location of topoViewNode
                objects. This name binding doesn't support create and
                delete management operations.!;
        ;
        REGISTERED AS { em-topo-binding 7 };

-- Attributes topoAllLayer ATTRIBUTE
        WITH ATTRIBUTE SYNTAX EM-TOPO-ASN1.TopoAllLayer;
        MATCHES FOR EQUALITY, SET-COMPARISON, SET-INTERSECTION;
        BEHAVIOUR topoAllLayerBehavior BEHAVIOUR DEFINED AS
                !This attribute identifies the list of allowed layer
                for topoNodeLayer.!;
        ;
        REGISTERED AS { em-topo-attribute 1 };
```

```
topoAllStatus ATTRIBUTE
        WITH ATTRIBUTE SYNTAX EM-TOPO-ASN1.TopoAllStatus;
        MATCHES FOR EQUALITY, SET-COMPARISON, SET-INTERSECTION;
        BEHAVIOUR topoAllStatusBehavior BEHAVIOUR DEFINED AS
                !This attribute identifies the list of allowed display
                status for topoNodeDisplayStatus.!;
        ;
        REGISTERED AS { em-topo-attribute 2 };

topoNodeChildren ATTRIBUTE
        WITH ATTRIBUTE SYNTAX EM-TOPO-ASN1.TopoNodes;
        MATCHES FOR EQUALITY, SET-COMPARISON, SET-INTERSECTION;
        BEHAVIOUR topoNodeChildrenBehaviour BEHAVIOUR DEFINED AS
                !This attribute contains a list of all topoNode objects
                which are logically children of this topoNode object.!;
        ;
        REGISTERED AS { em-topo-attribute 3 };

topoNodeCmipAgentMO ATTRIBUTE
        WITH ATTRIBUTE SYNTAX EM-TOPO-ASN1.TopoNodeMO;
        MATCHES FOR EQUALITY;
        BEHAVIOUR topoNodeCmipAgentMOBehaviour BEHAVIOUR DEFINED AS
                !This attribute identifies the CMIP agent object  that
                is represented by this topoNode object.!;
        ;
        REGISTERED AS { em-topo-attribute 4 };

topoNodeDBId ATTRIBUTE
        WITH ATTRIBUTE SYNTAX EM-TOPO-ASN1.TopoNullId;
        MATCHES FOR EQUALITY;
        BEHAVIOUR topoNodeDBIdBehaviour BEHAVIOUR DEFINED AS
                !This is a distinguished attribute of the topoNodeDB object.!;
        ;
        REGISTERED AS { em-topo-attribute 5 };

topoNodeDefaultMO ATTRIBUTE
        WITH ATTRIBUTE SYNTAX EM-TOPO-ASN1.TopoNodeMO;
        MATCHES FOR EQUALITY;
        BEHAVIOUR topoNodeDefaultMOBehaviour BEHAVIOUR DEFINED AS
                !This attribute identifies the managed object that
                is used as the default MO for launching request templates.!;
        ;
        REGISTERED AS { em-topo-attribute 6 };

topoNodeDisplayStatus ATTRIBUTE
        WITH ATTRIBUTE SYNTAX EM-TOPO-ASN1.TopoNodeDisplayStatus;
        MATCHES FOR EQUALITY, SET-COMPARISON, SET-INTERSECTION;
        BEHAVIOUR topoNodeDisplayStatusBehavior BEHAVIOUR DEFINED AS
                !This attribute identifies the list of display status
                defined by users.  Each entry of the list is a pair
                of attribute ID and value (integer only).  One example
                is performance.  Allowed attribute ID is specified by
                topoDatabase::allStatus.!;
        ;
        REGISTERED AS { em-topo-attribute 7 };

topoNodeGeoLocation ATTRIBUTE
        WITH ATTRIBUTE SYNTAX EM-TOPO-ASN1.TopoNodeGeoLocation;
        MATCHES FOR EQUALITY;
        BEHAVIOUR topoNodeGeoLocationBehavior BEHAVIOUR DEFINED AS
                !This attribute identifies the longitude and latitude
                of the topo node.  The default value is NULL.!;
        ;
        REGISTERED AS { em-topo-attribute 8 };
```

```
topoNodeId ATTRIBUTE
        WITH ATTRIBUTE SYNTAX EM-TOPO-ASN1.TopoNodeId;
        MATCHES FOR EQUALITY;
        BEHAVIOUR topoNodeIdBehaviour BEHAVIOUR DEFINED AS
                !This is a distinguished attribute of the topoNode
                object.!;
        ;
        REGISTERED AS { em-topo-attribute 9 };

topoNodeLayer ATTRIBUTE
        WITH ATTRIBUTE SYNTAX EM-TOPO-ASN1.TopoNodeLayer;
        MATCHES FOR EQUALITY;
        BEHAVIOUR topoNodeLayerBehavior BEHAVIOUR DEFINED AS
                !This attribute identifies the layer that the topo
                node is on.!;
        ;
        REGISTERED AS { em-topo-attribute 10 };

topoNodeMOSet ATTRIBUTE
        WITH ATTRIBUTE SYNTAX EM-TOPO-ASN1.TopoNodeMOSet;
        MATCHES FOR EQUALITY;
        BEHAVIOUR topoNodeMOSetBehaviour BEHAVIOUR DEFINED AS
                !This attribute identifies the managed objects elsewhere
                in the management information tree that are represented
                by this topoNode object.!;
        ;
        REGISTERED AS { em-topo-attribute 11 };

topoNodeName ATTRIBUTE
        WITH ATTRIBUTE SYNTAX EM-TOPO-ASN1.TopoNodeName;
        MATCHES FOR EQUALITY;
        BEHAVIOUR topoNodeNameBehaviour BEHAVIOUR DEFINED AS
                !This attribute can be used to provide a user-friendly
                label for the topoNode.!;
        ;
        REGISTERED AS { em-topo-attribute 12 };

topoNodeParents ATTRIBUTE
        WITH ATTRIBUTE SYNTAX EM-TOPO-ASN1.TopoNodes;
        MATCHES FOR EQUALITY;
        BEHAVIOUR topoNodeParentBehaviour BEHAVIOUR DEFINED AS
                !This attribute identifies the logical parent
                topoNodes of this topoNode.!;
        ;
        REGISTERED AS { em-topo-attribute 13 };

topoNodePeers ATTRIBUTE
        WITH ATTRIBUTE SYNTAX EM-TOPO-ASN1.TopoNodes;
        MATCHES FOR EQUALITY, SET-COMPARISON, SET-INTERSECTION;
        BEHAVIOUR topoNodePeersBehaviour BEHAVIOUR DEFINED AS
                !This attribute contains a list of all topoNode objects
                which are logically connected to this topoNode object.!;
        ;
        REGISTERED AS { em-topo-attribute 14 };

topoNodePropagatedSeverity ATTRIBUTE
        WITH ATTRIBUTE SYNTAX EM-TOPO-ASN1.TopoNodeSeverity;
        MATCHES FOR EQUALITY;
        BEHAVIOUR topoNodePropagatedSeverityBehaviour BEHAVIOUR DEFINED AS
                !This attribute specifies what propagated severity
                the topology node has.!;
        ;
        REGISTERED AS { em-topo-attribute 15 };

topoNodePropagateUp ATTRIBUTE
        WITH ATTRIBUTE SYNTAX EM-TOPO-ASN1.TopoBoolean;
```

```
        MATCHES FOR EQUALITY;
        BEHAVIOUR topoNodePropagateUpBehaviour BEHAVIOUR DEFINED AS
               !This attribute specifies whether the topology node should
               propagate its state to its parents.!;
        ;
        REGISTERED AS { em-topo-attribute 16 };

topoNodeRpcAgentMO ATTRIBUTE
        WITH ATTRIBUTE SYNTAX EM-TOPO-ASN1.TopoNodeMO;
        MATCHES FOR EQUALITY;
        BEHAVIOUR topoNodeRpcAgentMOBehaviour BEHAVIOUR DEFINED AS
               !This attribute identifies the RPC agent object  that
               is represented by this topoNode object.!;
        ;
        REGISTERED AS { em-topo-attribute 17 };

topoNodeSeverity ATTRIBUTE
        WITH ATTRIBUTE SYNTAX EM-TOPO-ASN1.TopoNodeSeverity;
        MATCHES FOR EQUALITY;
        BEHAVIOUR topoNodeSeverityBehaviour BEHAVIOUR DEFINED AS
               !This attribute specifies what severity
               the topology node has.!;
        ;
        REGISTERED AS { em-topo-attribute 18 };

topoNodeSnmpAgentMO ATTRIBUTE
        WITH ATTRIBUTE SYNTAX EM-TOPO-ASN1.TopoNodeMO;
        MATCHES FOR EQUALITY;
        BEHAVIOUR topoNodeSnmpAgentMOBehaviour BEHAVIOUR DEFINED AS
               !This attribute identifies the SNMP Proxy agent object  that
               is represented by this topoNode object.!;
        ;
        REGISTERED AS { em-topo-attribute 19 };

topoNodeState ATTRIBUTE
        WITH ATTRIBUTE SYNTAX EM-TOPO-ASN1.TopoNodeState;
        MATCHES FOR EQUALITY;
        BEHAVIOUR topoNodeStateBehaviour BEHAVIOUR DEFINED AS
               !This attribute specifies what the state of
               the topology node is.!;
        ;
        REGISTERED AS { em-topo-attribute 20 };

topoNodeType ATTRIBUTE
        WITH ATTRIBUTE SYNTAX EM-TOPO-ASN1.TopoTypeId;
        MATCHES FOR EQUALITY;
        BEHAVIOUR topoNodeTypeBehaviour BEHAVIOUR DEFINED AS
               !This attribute identifies the topoType object in
               the topology database which describes the purpose
               and behavior of this topoNode object.  This attribute
               may only be set to a new type which is derived from
               the existing type of the topoNode.!;
        ;
        REGISTERED AS { em-topo-attribute 21 };

topoStatePropagation ATTRIBUTE
        WITH ATTRIBUTE SYNTAX EM-TOPO-ASN1.TopoBoolean;
        MATCHES FOR EQUALITY;
        BEHAVIOUR topoStatePropagationBehaviour BEHAVIOUR DEFINED AS
               !This attribute identifies whether the state propagataion
               should be performed for all topology nodes.!;
        ;
        REGISTERED AS { em-topo-attribute 22 };

topoTypeAllBaseOf ATTRIBUTE
```

```
        WITH ATTRIBUTE SYNTAX EM-TOPO-ASN1.TopoTypes;
        MATCHES FOR EQUALITY, SET-COMPARISON, SET-INTERSECTION;
        BEHAVIOUR topoTypeAllBaseOfBehaviour BEHAVIOUR DEFINED AS
                !This attribute names the topoType objects that
                have this topoType object as a logical base class
                through any number of derivations.!;
        ;
        REGISTERED AS { em-topo-attribute 23 };

topoTypeAllDerivedFrom ATTRIBUTE
        WITH ATTRIBUTE SYNTAX EM-TOPO-ASN1.TopoTypes;
        MATCHES FOR EQUALITY, SET-COMPARISON, SET-INTERSECTION;
        BEHAVIOUR topoTypeAllDerivedFromBehaviour BEHAVIOUR DEFINED AS
                !This attribute names the topoType objects that
                this topoType object is logically derived from,
                through any number of derivations.!;
        ;
        REGISTERED AS { em-topo-attribute 24 };

topoTypeAllLegalArcs ATTRIBUTE
        WITH ATTRIBUTE SYNTAX EM-TOPO-ASN1.TopoTypes;
        MATCHES FOR EQUALITY, SET-COMPARISON, SET-INTERSECTION;
        BEHAVIOUR topoTypeAllLegalArcsBehaviour BEHAVIOUR DEFINED AS
                !This attribute names the topoType objects that
                this topoType object can connect to, including
                those specified by any base types!;
        ;
        REGISTERED AS { em-topo-attribute 25 };

topoTypeAllLegalChildren ATTRIBUTE
        WITH ATTRIBUTE SYNTAX EM-TOPO-ASN1.TopoTypes;
        MATCHES FOR EQUALITY, SET-COMPARISON, SET-INTERSECTION;
        BEHAVIOUR topoTypeAllLegalChildrenBehaviour BEHAVIOUR DEFINED AS
                !This attribute names the topoType objects that
                this topoType object can contain, including
                those specified by any base types!;
        ;
        REGISTERED AS { em-topo-attribute 26 };

topoTypeBaseOf ATTRIBUTE
        WITH ATTRIBUTE SYNTAX EM-TOPO-ASN1.TopoTypes;
        MATCHES FOR EQUALITY, SET-COMPARISON, SET-INTERSECTION;
        BEHAVIOUR topoTypeBaseOfBehaviour BEHAVIOUR DEFINED AS
                !This attribute names the topoType objects that
                directly name this topoType object as a logical
                base class.!;
        ;
        REGISTERED AS { em-topo-attribute 27 };

topoTypeDBId ATTRIBUTE
        WITH ATTRIBUTE SYNTAX EM-TOPO-ASN1.TopoNullId;
        MATCHES FOR EQUALITY;
        BEHAVIOUR topoTypeDBIdBehaviour BEHAVIOUR DEFINED AS
                !This is a distinguished attribute of the topoTypeDB object.!;
        ;
        REGISTERED AS { em-topo-attribute 28 };

topoTypeDefaultLayer ATTRIBUTE
        WITH ATTRIBUTE SYNTAX EM-TOPO-ASN1.TopoTypeDefaultLayer;
        MATCHES FOR EQUALITY;
        BEHAVIOUR topoNodeDefaultLayerBehavior BEHAVIOUR DEFINED AS
                !This attribute identifies the default layer that is
                used by the topo node.!;
        ;
        REGISTERED AS { em-topo-attribute 29 };
```

```
topoTypeDerivedFrom ATTRIBUTE
        WITH ATTRIBUTE SYNTAX EM-TOPO-ASN1.TopoTypes;
        MATCHES FOR EQUALITY, SET-COMPARISON, SET-INTERSECTION;
        BEHAVIOUR topoTypeDerivedFromBehaviour BEHAVIOUR DEFINED AS
                !This attribute names the topoType objects that
                this topoType object is logically derived from.!;
        ;
        REGISTERED AS { em-topo-attribute 30 };

topoTypeDrawMethod ATTRIBUTE
        WITH ATTRIBUTE SYNTAX EM-TOPO-ASN1.TopoTypeDrawMethod;
        MATCHES FOR EQUALITY;
        BEHAVIOUR topoTypeDrawMethodBehaviour BEHAVIOUR DEFINED AS
                !This attribute defines the drawable of the topoType
                object.!;
        ;
        REGISTERED AS { em-topo-attribute 31 };

topoTypeId ATTRIBUTE
        WITH ATTRIBUTE SYNTAX EM-TOPO-ASN1.TopoTypeId;
        MATCHES FOR EQUALITY;
        BEHAVIOUR topoTypeIdBehaviour BEHAVIOUR DEFINED AS
                !This attribute is the distinguished attribute for a
                topoType object.!;
        ;
        REGISTERED AS { em-topo-attribute 32 };

topoTypeLegalArcs ATTRIBUTE
        WITH ATTRIBUTE SYNTAX EM-TOPO-ASN1.TopoTypes;
        MATCHES FOR EQUALITY, SET-COMPARISON, SET-INTERSECTION;
        BEHAVIOUR topoTypeMaxLegalArcsBehaviour BEHAVIOUR DEFINED AS
                !This attribute identifies the topoTypes that
                may legally form arcs with this topoType.!;
        ;
        REGISTERED AS { em-topo-attribute 33 };

topoTypeLegalChildren ATTRIBUTE
        WITH ATTRIBUTE SYNTAX EM-TOPO-ASN1.TopoTypes;
        MATCHES FOR EQUALITY, SET-COMPARISON, SET-INTERSECTION;
        BEHAVIOUR topoTypeMaxLegalChildrenBehaviour BEHAVIOUR DEFINED AS
                !This attribute identifies the topoTypes that
                may legally be children of this topoType.!;
        ;
        REGISTERED AS { em-topo-attribute 34 };

topoTypeMaxTopoLevel ATTRIBUTE
        WITH ATTRIBUTE SYNTAX EM-TOPO-ASN1.TopoTypeMaxTopoLevel;
        MATCHES FOR EQUALITY, ORDERING;
        BEHAVIOUR topoTypeMaxTopoLevelBehaviour BEHAVIOUR DEFINED AS
                !This attribute identifies the highest abstract
                graph level that this node participates in the topology.
                A topoNode may not have more than one arc to each abstract
                graph level higher than this.!;
        ;
        REGISTERED AS { em-topo-attribute 35 };

topoTypeMaxVisibleLevel ATTRIBUTE
        WITH ATTRIBUTE SYNTAX EM-TOPO-ASN1.TopoTypeMaxVisibleLevel;
        MATCHES FOR EQUALITY, ORDERING;
        BEHAVIOUR topoTypeMaxVisibleLevelBehaviour BEHAVIOUR DEFINED AS
                !This attribute identifies the highest abstract
                graph level that this node logically appears in.
                A topoNode may not have any arcs to an abstract graph
                level higher than this.!;
        ;
        REGISTERED AS { em-topo-attribute 36 };
```

```
topoViewBackgroundImage ATTRIBUTE
        WITH ATTRIBUTE SYNTAX EM-TOPO-ASN1.TopoViewBackgroundImage;
        MATCHES FOR EQUALITY;
        BEHAVIOUR topoViewBackgroundImageBehaviour BEHAVIOUR DEFINED AS
                !This attribute contains the relative file name of
                a image to display in the view.!;
        ;
        REGISTERED AS { em-topo-attribute 37 };

topoViewDBId ATTRIBUTE
        WITH ATTRIBUTE SYNTAX EM-TOPO-ASN1.TopoNullId;
        MATCHES FOR EQUALITY;
        BEHAVIOUR topoViewDBIdBehaviour BEHAVIOUR DEFINED AS
                !This is a distinguished attribute of the topoNodeDB object.!;
        ;
        REGISTERED AS { em-topo-attribute 38 };

topoViewMapConfigFile ATTRIBUTE
        WITH ATTRIBUTE SYNTAX EM-TOPO-ASN1.TopoViewMapConfigFile;
        MATCHES FOR EQUALITY;
        BEHAVIOUR topoViewMapConfigFileBehaviour BEHAVIOUR DEFINED AS
                !This attribute is the file for vector (geographic) map
                configuration.!;
        ;
        REGISTERED AS { em-topo-attribute 39 };

topoViewMapInitialGeoArea ATTRIBUTE
        WITH ATTRIBUTE SYNTAX EM-TOPO-ASN1.TopoViewMapInitialGeoArea;
        MATCHES FOR EQUALITY;
        BEHAVIOUR topoViewMapInitialGeoAreaBehaviour BEHAVIOUR DEFINED AS
                !This attribute is to specify the initial zoom area of
                the geographical map.!;
        ;
        REGISTERED AS { em-topo-attribute 40 };

topoViewNodePosition ATTRIBUTE
        WITH ATTRIBUTE SYNTAX EM-TOPO-ASN1.TopoViewNodePosition;
        MATCHES FOR EQUALITY;
        BEHAVIOUR topoViewNodePositionBehaviour BEHAVIOUR DEFINED AS
                !This attribute contains x,y coordinates of the topoNodeView
                image to be displayed in the view.!;
        ;
        REGISTERED AS { em-topo-attribute 41 };

topoNodeIsManaged ATTRIBUTE
        WITH ATTRIBUTE SYNTAX EM-TOPO-ASN1.TopoNodeManaged;
        MATCHES FOR EQUALITY;
        BEHAVIOUR topoNodeIsManagedBehaviour BEHAVIOUR DEFINED AS
                !This attribute specifies the logical and of this nodes
                topoNodeManaged attribute with that of its parent's
                topoNodeIsManaged attribute.!;
        ;
        REGISTERED AS { em-topo-attribute 42 };

topoNodeManaged ATTRIBUTE
        WITH ATTRIBUTE SYNTAX EM-TOPO-ASN1.TopoNodeManaged;
        MATCHES FOR EQUALITY;
        BEHAVIOUR topoNodeManagedBehaviour BEHAVIOUR DEFINED AS
                !This attribute specifies whether the topoNode should
                be managed by applications.!;
        ;
        REGISTERED AS { em-topo-attribute 43 };

topoNodeUserData ATTRIBUTE
        WITH ATTRIBUTE SYNTAX EM-TOPO-ASN1.TopoNodeUserData;
```

```
        MATCHES FOR EQUALITY;
        BEHAVIOUR topoNodeUserDataBehaviour BEHAVIOUR DEFINED AS
                !This attribute specifies a user defined data to
                be stored with the topoNode.!;
        ;
        REGISTERED AS { em-topo-attribute 44 };

topoViewNodeAutoPosition ATTRIBUTE
        WITH ATTRIBUTE SYNTAX EM-TOPO-ASN1.TopoBoolean;
        MATCHES FOR EQUALITY;
        BEHAVIOUR topoViewNodeAutoPositionBehaviour BEHAVIOUR DEFINED AS
                !This attribute specifies if at the creation time the position
                of the topoViewNode is automatically generated.!;
        ;
        REGISTERED AS { em-topo-attribute 45 };

-- Actions topoNodeGetByName ACTION
        BEHAVIOUR topoNodeGetByNameBehaviour BEHAVIOUR DEFINED AS
                !This action returns the topoNodeId of the topoNode whose
                topoNodeName attribute matches the input name!;
        ;
        WITH INFORMATION SYNTAX EM-TOPO-ASN1.TopoNodeName;
        WITH REPLY SYNTAX EM-TOPO-ASN1.TopoNodes;
        REGISTERED AS { em-topo-action 1 };

topoNodeGetByType ACTION
        BEHAVIOUR topoNodeGetByTypeBehaviour BEHAVIOUR DEFINED AS
                !This action returns a list of topoNodeIds of the topoNodes
                whose topoNodeType attributes match the input type!;
        ;
        WITH INFORMATION SYNTAX EM-TOPO-ASN1.TopoTypeId;
        WITH REPLY SYNTAX EM-TOPO-ASN1.TopoNodes;
        REGISTERED AS { em-topo-action 2 };

topoNodeGetByMO ACTION
        BEHAVIOUR topoNodeGetByMOBehaviour BEHAVIOUR DEFINED AS
                !This action returns a list of topoNodeIds of the topoNodes
                which represent the input managed object!;
        ;
        WITH INFORMATION SYNTAX EM-TOPO-ASN1.TopoNodeMO;
        WITH REPLY SYNTAX EM-TOPO-ASN1.TopoNodes;
        REGISTERED AS { em-topo-action 3 };

topoGetViewGraph ACTION
        BEHAVIOUR topoGetViewGraphBehaviour BEHAVIOUR DEFINED AS
                !This action returns the hierarchy of all topoViews!;
        ;
        WITH INFORMATION SYNTAX EM-TOPO-ASN1.TopoNullId;
        WITH REPLY SYNTAX EM-TOPO-ASN1.TopoViewGraph;
        REGISTERED AS { em-topo-action 4 };

END
```

APPENDIX 2 topo.asn1

© Copyright 1995
Sun Microsystems, Inc.
All Rights Reserved

```
-- @(#)topo.asn1      2.16 95/07/12 Sun Microsystems.
-- Copyright 12 Jul 1995 Sun Microsystems, Inc. All Rights Reserved EM-TOPO-ASN1 {
        iso(1) org(3) dod(6) internet(1) private(4) enterprises(1) sun(42)
        products(2) management(2) em(2) newtopo(40)
}

DEFINITIONS ::=
BEGIN

IMPORTS
        ObjectInstance
  FROM CMIP-1 { joint-iso-ccitt ms(9) cmip(1) modules(0) protocol(3) };

em-topo OBJECT IDENTIFIER ::= {
        iso(1) org(3) dod(6) internet(1) private(4) enterprises(1) sun(42)
        products(2) management(2) em(2) topology(40)
} em-topo-objectClass OBJECT IDENTIFIER ::= { em-topo 3 }
em-topo-binding OBJECT IDENTIFIER ::= { em-topo 6 }
em-topo-attribute OBJECT IDENTIFIER ::= { em-topo 7 }
em-topo-action OBJECT IDENTIFIER ::= { em-topo 9 }

--- Default Values
nullTopoNodeMO TopoNodeMO ::= null : NULL
emptyTopoNodeMOSet TopoNodeMOSet ::= { }
emptyTopoAllStatus TopoAllStatus ::= { }
emptyTopoAllLayer TopoAllLayer ::= { }
defaultDrawMethod TopoTypeDrawMethod ::= circle
nullGeoLocation TopoNodeGeoLocation ::= null : NULL
defaultTopoTypeDefaultLayer TopoTypeDefaultLayer ::= "default"
emptyLayer TopoNodeLayer ::= ""
emptyTopoNodeDisplayStatus TopoNodeDisplayStatus ::= { }
defaultMaxVisibleLevel TopoTypeMaxVisibleLevel ::= 0
defaultMaxTopoLevel TopoTypeMaxTopoLevel ::= 0
defaultTopoTypes TopoTypes ::= { }
defaultBackgroundImage TopoViewBackgroundImage ::= ""
defaultMapConfigFile TopoViewMapConfigFile ::= ""
defaultMapInitialGeoArea TopoViewMapInitialGeoArea ::= null : NULL
topoBooleanTrue TopoBoolean ::= TRUE
topoBooleanFalse TopoBoolean ::= FALSE
emptyUserData TopoNodeUserData ::= ""

TopoNullId ::= NULL

TopoAllStatus ::= SET OF GraphicString

TopoAllLayer ::= SET OF GraphicString

TopoBoolean ::= BOOLEAN

TopoNodeId ::= INTEGER (0..4294967295)

TopoNodeState ::= INTEGER (0..4294967295)

TopoNodeSeverity ::= INTEGER (0..4294967295)

TopoNodeMO ::= CHOICE {
        object  ObjectInstance,
        null    NULL
}

TopoNodeMOSet ::= SET OF ObjectInstance
```

```
TopoNodeName ::= GraphicString

TopoNodes ::= SET OF TopoNodeId

TopoNodeDisplayStatus ::= SET OF SEQUENCE {
        status          GraphicString,
        value           INTEGER
}

TopoNodeLayer ::= GraphicString

TopoNodeGeoLocation ::= CHOICE {
        null    NULL,
        value   SEQUENCE {
                        latitude        REAL,
                        longitude       REAL
                }
}

TopoNodeUserData ::= GraphicString

TopoTypeId::= GraphicString

TopoTypeMaxVisibleLevel ::= INTEGER (-32768..32767)

TopoTypeMaxTopoLevel ::= INTEGER (-32768..32767)

TopoTypes ::= SET OF TopoTypeId

TopoTypeDrawMethod ::= ENUMERATED {
        circle          (0),
        square          (1),
        rectangle       (2),
        triangle        (3),
        hexagon         (4),
        line            (5)
}

TopoTypeDefaultLayer ::= GraphicString

TopoViewNodePosition ::= SEQUENCE {
        x       INTEGER,
        y       INTEGER
}

TopoViewBackgroundImage ::= GraphicString

TopoViewMapConfigFile ::= GraphicString

TopoViewMapInitialGeoArea ::= CHOICE {
        null    NULL,
        area    SEQUENCE {
                        centerLatitude  REAL,
                        centerLongitude REAL,
                        widthInKm       REAL
                }
}

TopoNodeManaged ::= BOOLEAN

TopoNodeData ::= SEQUENCE {
        id      TopoNodeId,
        name    TopoNodeName
}

TopoViewGraphNode ::= SEQUENCE {
```

```
        node        TopoNodeData,
        parents     SET OF TopoNodeData
}

TopoViewGraph ::= SET OF TopoViewGraphNode

END
```

What is claimed is:

1. A computer network comprising:

a plurality of network nodes and interconnections;

a network management system that manages physical and logical topologies of said plurality of network nodes and interconnections, said network management system comprising a user modifiable database of managed network resources, said database of managed network resources comprising data indicative of physical and logical topologies, attributes for said plurality of network nodes, associated node types, and a plurality of views associated with said nodes, said plurality of views customized by said network management system based on user input changes in said attributes of said nodes; and at least one network management user, said at least one network management user displaying said plurality of views of said network using said database of managed network resources.

2. The computer network as recited in claim 1 wherein said attributes of said nodes comprise parent relationships, and wherein a new view node is formed each time a new parent is added to an attribute of a node.

3. The computer network as recited in claim 2 wherein a view node is deleted each time a parent is deleted from attributes of a node.

4. The computer network as recited in claim 1 wherein the at least one network management user access the database of managed network resources through physical topology database.

5. The computer network as recited in claim 1 further comprising a network viewer on a plurality of user workstations, said user workstations forming views of said network based on said database of managed network resources.

6. The computer network as recited in claim 1 wherein said network nodes are defined by a node database object class, said node database object class containing node objects, a type database object class, said type object class containing network object types, and a view database object class, said view database object class containing view objects of said network.

7. The computer network as recited in claim 6 wherein each of said nodes is associated with a severity, wherein alarms posted for a particular node are propagated to selective views of said network.

8. The computer network as recited in claim 1 wherein at least one view of said network are updated by said network management system when a new node is added to said system.

9. The computer network as recited in claim 1 wherein the plurality of views of said network comprise logical groups of nodes which the at least one network management user manages.

10. The computer network as recited in claim 1 wherein the plurality of views of said network are each graphical representation of a collection of managed objects.

11. The computer network as recited in claim 1 wherein the network management system maintains integrity of the database of managed network resources by modifying the attributes for the plurality of network nodes upon addition and deletion of new nodes.

12. A method of managing a computer network comprising:

forming an object oriented database of managed network resources, said database of managed network resources comprising data indicative of physical and logical topologies, network nodes, associated node types, and associated views of said nodes;

managing said computer network by allowing user modifications of said database of managed network resources;

displaying at least one view of said network using said database of managed network resources; and modifying said at least one view based on said user modifications of said nodes in said database of managed network resources.

13. The method as recited in claim 12 further comprising the steps of:

defining parent relationships of said nodes; and forming new views based on additions of parents to a node.

14. The method as recited in claim 13 further comprising the step of deleting a view node when a parent is deleted from a node.

15. The method as recited in claim 12 wherein said step of forming an object oriented database of managed network resources comprises the steps of:

forming a node database type class containing a plurality of node type objects;

forming a node type database class containing a topography of nodes in said network; and forming a view type database class containing views of objects in said network.

16. The method as recited in claim 12 further comprising the step of defining an alarm severity for at least one node in said database, said alarm severity defining when alarms are propagated to other nodes in a view of said network.

17. Software on one or more storage media, for managing network nodes and interconnections of a computer network, said software comprising:

a database of managed network resources, said database of managed network resources comprising data indicative of physical and logical topologies, network nodes, network node types, and views of said nodes; and a network administration program, said network administration program managing said network by allowing user modifications of said database of managed network resources, said network administration program modifying said views of said nodes based on user input of changes in attributes of said nodes.

18. The software as recited in claim 17 further comprising a network viewing program, said network viewing program displaying various views of said network based on user selection input.

19. The software as recited in claim 17 further comprising an alarm propagation system, said alarm propagation system propagating alarms in views of said network based on propagation severities associated with said nodes.

* * * * *

UNITED STATES PATENT AND TRADEMARK OFFICE
CERTIFICATE OF CORRECTION

PATENT NO. : 5,848,243
DATED : December 8, 1998
INVENTOR(S) : Kulkarni et al.

It is certified that error appears in the above-identified patent and that said Letters Patent is hereby corrected as shown below:

```
On the title page, Item [54] and Column 1, In the title:
the word TOPOLGIES should --TOPOLOGIES--.
```

Signed and Sealed this

Twenty-ninth Day of June, 1999

Attest:

Q. TODD DICKINSON

Attesting Officer

Acting Commissioner of Patents and Trademarks